(12) United States Patent
Jiang et al.

(10) Patent No.: US 11,601,661 B2
(45) Date of Patent: Mar. 7, 2023

(54) DEEP LOOP FILTER BY TEMPORAL DEFORMABLE CONVOLUTION

(71) Applicant: TENCENT AMERICA LLC, Palo Alto, CA (US)

(72) Inventors: Wei Jiang, San Jose, CA (US); Wei Wang, Palo Alto, CA (US); Zeqiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/394,504

(22) Filed: Aug. 5, 2021

(65) Prior Publication Data
US 2022/0116633 A1    Apr. 14, 2022

Related U.S. Application Data

(60) Provisional application No. 63/090,126, filed on Oct. 9, 2020.

(51) Int. Cl.
| | |
|---|---|
| *H04N 19/42* | (2014.01) |
| *G06K 9/62* | (2022.01) |
| *H04N 19/172* | (2014.01) |
| *H04N 19/136* | (2014.01) |
| *G06V 20/40* | (2022.01) |

(52) U.S. Cl.
CPC ........... *H04N 19/42* (2014.11); *G06K 9/6232* (2013.01); *G06V 20/46* (2022.01); *H04N 19/136* (2014.11); *H04N 19/172* (2014.11)

(58) Field of Classification Search
None
See application file for complete search history.

(56) References Cited

U.S. PATENT DOCUMENTS

| | | | |
|---|---|---|---|
| 2018/0218502 A1* | 8/2018 | Golden | ............... G06N 3/08 |
| 2018/0249158 A1* | 8/2018 | Huang | ............... H04N 19/46 |
| 2020/0265567 A1* | 8/2020 | Hu | ............... G06N 3/0454 |

OTHER PUBLICATIONS

Deng et al., "Spatio-Temporal Deformable Convolution for Compressed Video Quality Enhancement", Apr. 3, 2020, The Thirty-Fourth AAAI Conference on Artificial Intelligence, pp. 10696-10703 (Year: 2020).*
International Search Report dated Nov. 23, 2021 in Application No. PCT/US21/46471.
Written Opinion of the International Searching Authority dated Nov. 23, 2021 in Application No. PCT/US21/46471.
Jianing Deng et al., "Spatio-Temporal Deformable Convolution for Compressed Video Quality Enhancement", Apr. 3, 2020, The Thirty-Fourth AAAI Conference on Artificial Intelligence, pp. 10696-10703 (8 pages total).

(Continued)

*Primary Examiner* — Christopher G Findley
(74) *Attorney, Agent, or Firm* — Sughrue Mion, PLLC

(57) ABSTRACT

A method, apparatus and storage medium for performing video coding are provided. The method includes obtaining a plurality of image frames in a video sequence; determining a feature map for each of the plurality of image frames and determining an offset map based on the feature map; determining an aligned feature map by performing a temporal deformable convolution (TDC) on the feature map and the offset map; and generating a plurality of aligned frames based on the aligned feature map.

18 Claims, 6 Drawing Sheets

(56) References Cited

OTHER PUBLICATIONS

Extended European Search Report dated Dec. 5, 2022 in European Application No. 21878177.1.
Tian et al., "TDAN: Temporally-Deformable Alignment Network for Video Super-Resolution", 2020 IEEE/CVF Conference on Computer Vision and Pattern Recognition (CVPR), IEEE, Jun. 13, 2020, pp. 3357-3366 (10 pages total).
Liu et al., "Deep Learning-Based Video Coding: A Review and a Case Study", ACM Computing Surveys, Feb. 2020, vol. 35, No. 1, Article 11, pp. 11:1-11:35 (35 pages total).

* cited by examiner

DEEP LOOP FILTER BY TEMPORAL DEFORMABLE CONVOLUTION

CROSS-REFERENCE TO RELATED APPLICATION

This application is based on and claims priority to U.S. Provisional Application No. 63/090,126 filed on Oct. 9, 2020, in the United States Patent and Trademark Office, the disclosure of which is incorporated by reference herein in its entirety.

BACKGROUND

1. Field

The disclosure relates to the field of video coding, and in particular, to a device and a method of using a loop filter to process a decoded video based on a Deep Neural Network (DNN) with Temporal Deformable Convolutions (TDC).

2. Description of Related Art

Traditional video coding standards, such as the H.264/Advanced Video Coding (H.264/AVC), High-Efficiency Video Coding (HEVC) and Versatile Video Coding (VVC) share a similar (recursive) block-based hybrid prediction/transform framework where individual coding tools like the intra/inter prediction, integer transforms, and context-adaptive entropy coding, are intensively handcrafted to optimize the overall efficiency. Basically, the spatiotemporal pixel neighborhoods are leveraged for predictive signal construction, to obtain corresponding residuals for subsequent transform, quantization, and entropy coding. On the other hand, the nature of Deep Neural Networks (DNN) is to extract different levels of spatiotemporal stimuli by analyzing spatiotemporal information from the receptive field of neighboring pixels. The capability of exploring highly nonlinearity and nonlocal spatiotemporal correlations provide promising opportunity for largely improved compression quality.

However, the compressed video inevitably suffers from compression artifacts, which severely degrade the Quality of Experience (QoE). The DNN-based methods have been developed to enhance the visual quality of compressed images, such as image denoising, super-resolution, deblurring, etc. When these methods are applied to videos, image-based methods suffer from instability and fluctuation caused by changing compressed video quality, video scene, and object motion in a video. Accordingly, it is important to make use of information from neighboring frames in videos to stabilize and improve the enhanced visual quality.

One caveat of leveraging information from multiple neighboring video frames is the complex motion caused by moving camera and dynamic scenes. Traditional block-based motion vectors do not work well for non-translational motions. Also, while learning-based optical flow methods can provide more accurate motion information at pixel-level, they are still prone to errors, especially along the boundary of moving objects.

Therefore, one or more embodiments of the disclosure provide a DNN-based model with Temporal Deformable Convolutions (TDC) to handle arbitrary and complex motions in a data-driven fashion without explicit motion estimation.

SUMMARY

According to an embodiment, there is provided a method of performing video coding using one or more neural networks with a loop filter. The method includes: obtaining a plurality of image frames in a video sequence; determining a feature map for each of the plurality of image frames and determining an offset map based on the feature map; determining an aligned feature map by performing a temporal deformable convolution (TDC) on the feature map and the offset map; and generating a plurality of aligned frames.

According to an embodiment, there is provided an apparatus including: at least one memory storing computer program code; and at least one processor configured to access the at least one memory and operate as instructed by the computer program code. The computer program code includes: obtaining code configured to cause the at least one processor to obtain a plurality of image frames in a video sequence; determining code configured to cause the at least one processor to: determine a feature map for each of the plurality of image frames and determine an offset map based on the feature map; determine an aligned feature map by performing a temporal deformable convolution (TDC) on the feature map and the offset map; and generating code configured to cause the at least one processor to generate a plurality of aligned frames.

According to an embodiment, there is provided a non-transitory computer-readable storage medium storing computer program code, the computer program code, when executed by at least one processor, the at least one processor is configured to: obtain a plurality of image frames in a video sequence; determine a feature map for each of the plurality of image frames and determining an offset map based on the feature map; determine an aligned feature map by performing a temporal deformable convolution (TDC) on the feature map and the offset map; and generate a plurality of aligned frames.

BRIEF DESCRIPTION OF THE DRAWINGS

The following description briefly introduces the accompanying drawings, which illustrate the one or more embodiments of the disclosure.

DETAILED DESCRIPTION

Example embodiments are described in detail herein with reference to the accompanying drawings. It should be understood that the one or more embodiments of the disclosure described herein are only example embodiments, and should not be construed as limiting the scope of the disclosure.

Figure 1:
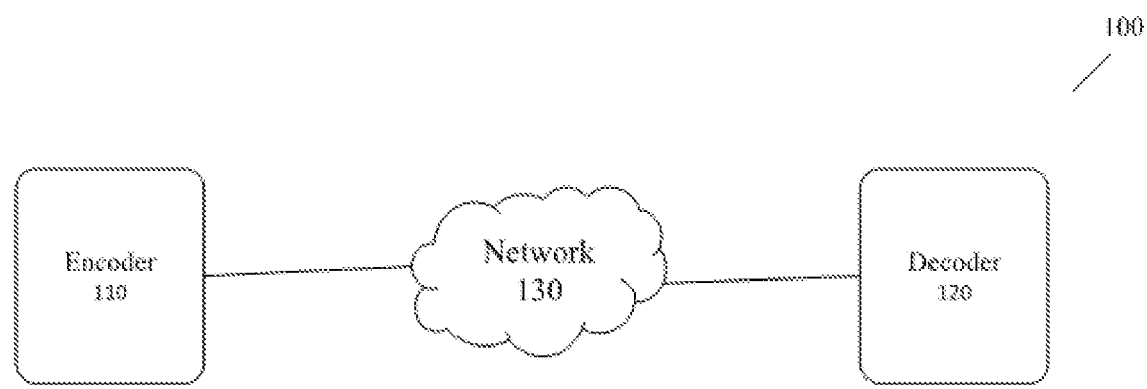
FIG. 1 is a diagram illustrating a video coding system according to an embodiment.

FIG. 1 is a diagram illustrating a video coding system according to an embodiment.

Figure 2:
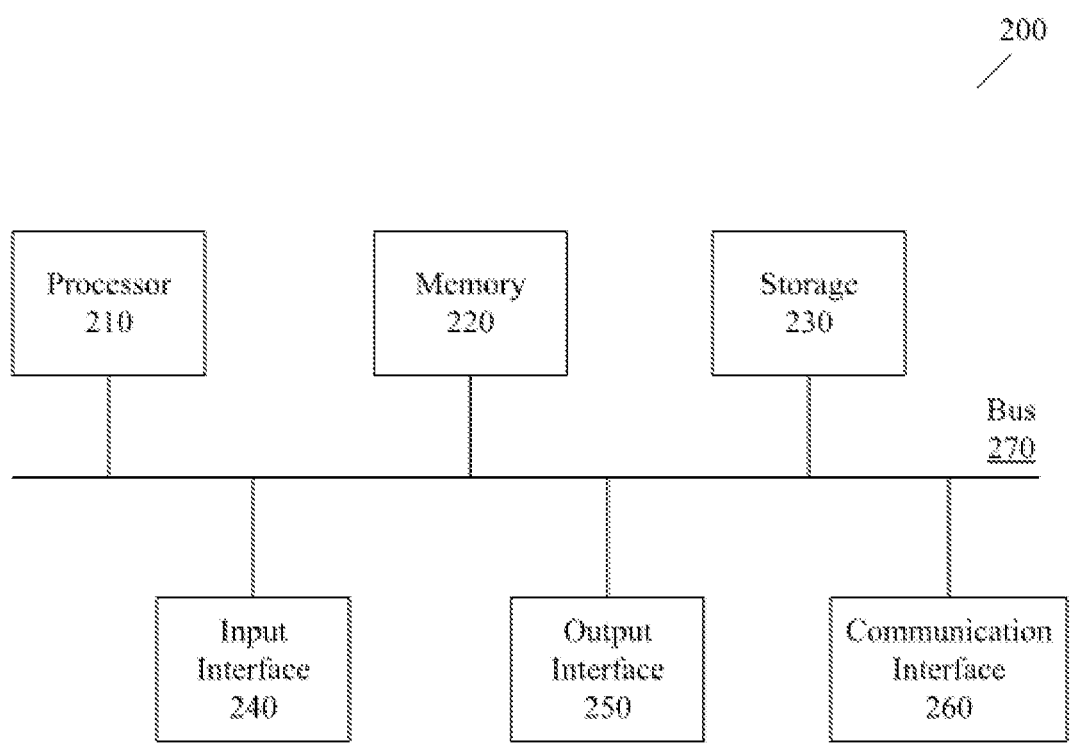
FIG. 2 is a diagram illustrating an example of a computing device including an encoder and a decoder according to an embodiment.

Referring to FIG. 1, a video coding system 100 may include an encoder 110 and a decoder 120 connected to each other through a network 130. The encoder 110 may be configured to compress image data or video data. The encoder 110 may be disposed on a server side of the video coding system 100. The server may be a cloud server or a server luster that includes a plurality of servers. The server may include a processor, a communication interface, and a database. The processor may be configured to encode one or more image frames of a video sequence. The communication interface may be configured to transmit and receive the one or more image frames of a video sequence or other data that may be relevant to encoding the video sequence. The database may be configured to store the one or more images of the video sequence, encoded data and decoded data. However, the one or more embodiments are not limited thereto. For example, the encoder 110 may be implemented in a computing device (e.g., a desktop computer, a laptop computer, a tablet computer, a mobile device, a personal digital assistant (PDA), a console, a wearable device, etc.) connected to the network 130. The encoder 110 may be software running on a computing device that FIG. 2 is a diagram illustrating an example of a computing device implemented as an encoder and/or a decoder according to an embodiment. The computing device 200 may be implemented as the encoder 110 and/or the decoder 120 shown in FIG. 1.

Referring to FIG. 2, the computing device 200 may include a processor 210, a memory 220, a storage 230, an input interface 240, an output interface 250, a communication interface 260, and a bus 270.

The processor 210 is implemented in hardware, firmware, or a combination of hardware and software. The processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 210 includes one or more processors capable of being programmed to perform a function.

The memory 220 includes a random access memory (RAM), a read only memory (ROM), and/or another type of dynamic or static storage device (e.g., a flash memory, a magnetic memory, and/or an optical memory) that stores information and/or instructions for use by the processor 210.

The storage 230 stores information and/or software related to the operation and use of the computing device 200. For example, the storage 230 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input interface 240 includes a component that permits the computing device 200 to receive information, such as via user input (e.g., a touch screen display, a keyboard, a keypad, a mouse, a button, a switch, and/or a microphone). Additionally, or alternatively, the input interface 240 may include a sensor for sensing information (e.g., a global positioning system (GPS) component, an accelerometer, a gyroscope, and/or an actuator). The output interface 250 includes a component that provides output information from the computing device 200 (e.g., a display, a speaker, and/or one or more light-emitting diodes (LEDs)).

The communication interface 260 includes a transceiver-like component (e.g., a transceiver and/or a separate receiver and transmitter) that enables the computing device 200 to communicate with other devices, such as via a wired connection, a wireless connection, or a combination of wired and wireless connections. The communication interface 260 may permit the computing device 200 to receive information from another device and/or provide information to another device. For example, the communication interface 260 may include an Ethernet interface, an optical interface, a coaxial interface, an infrared interface, a radio frequency (RF) interface, a universal serial bus (USB) interface, a Wi-Fi interface, a cellular network interface, or the like.

The bus 270 includes a component that permits communication among the components of the computing device 200.

The computing device 200 may perform one or more operations described herein. The computing device 200 may perform operations described herein in response to the processor 210 executing software instructions stored in a non-transitory computer readable medium, such as the memory 220 and/or the storage 230. A computer-readable medium is defined herein as a non-transitory memory device. A memory device may include memory space within a single physical storage device or memory space spread across multiple physical storage devices.

Software instructions may be read into the memory 220 and/or the storage 230 from another computer-readable medium or from another device via the communication interface 260. When executed, software instructions stored in the memory 220 and/or the storage 230 may cause the processor 210 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the computing device 200 may include additional components, fewer components, different components, or differently arranged components than those shown in FIG. 2. Additionally, or alternatively, a set of components (e.g., one or more components) of the computing device 200 may perform one or more functions described as being performed by another set of components of the computing device 200.

Figure 3:
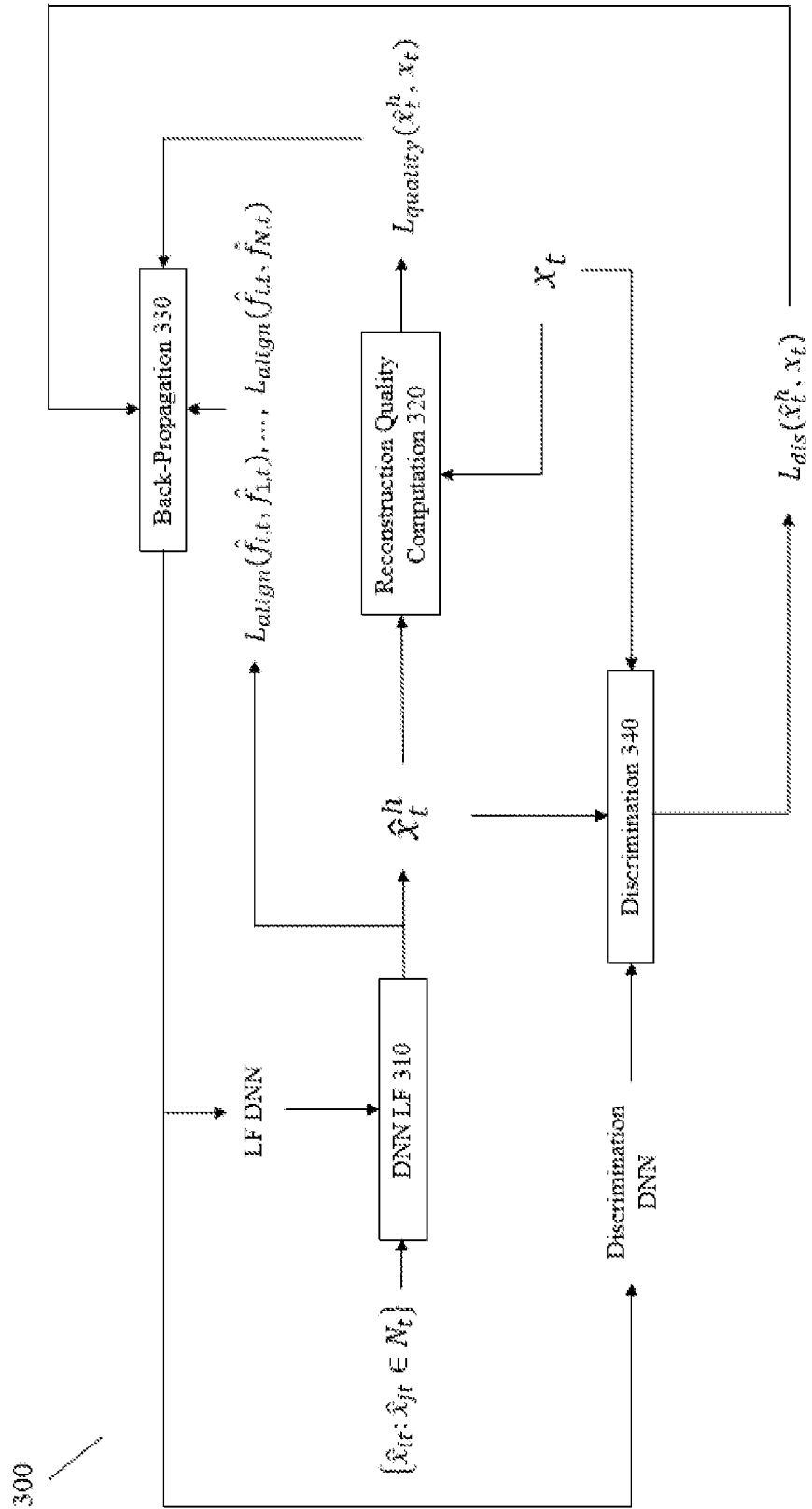
FIG. 3 is a diagram illustrating a method of training a DNN LF module according to an embodiment.

FIG. 3 is a diagram illustrating a method of training a DNN LF module according to an embodiment.

First, a typical video compression framework will be described herein. Assume that an input video x includes a plurality of original image frames $x_1, \ldots, x_T$. In the first motion estimation step, the plurality of original image frames are partitioned into spatial blocks, each spatial block can be further partitioned into smaller blocks iteratively, and a set of motion vectors $m_t$ between a current original image frame $x_t$ and a set of previous reconstructed frames $\{\hat{x}_j\}_{t-1}$ is computed for each spatial block. Here, the subscript t denotes the current t-th encoding cycle, which may not match the time stamp of the image frame. Also, the set of previous reconstructed frames $\{\hat{x}_j\}_{t-1}$ may include frames from multiple previous encoding cycles. In the second motion compensation step, a predicted frame $\tilde{x}_t$ is obtained by copying the corresponding pixels of the previous reconstructed frames $\{\hat{x}_j\}_{t-1}$ based on the motion vectors $m_t$, and a residual $r_t$ between the current original image frame $x_t$ and the predicted frame $\tilde{x}_t$ is obtained by $r_t = x_t - \tilde{x}_t$. In the third estimation step, after performing a Discrete Cosine Transform (DCT) on the spatial blocks, the DCT coefficients of residual $r_t$ are quantized to obtain a quantized residual $\hat{y}_t$. Therefrom, both the motion vectors $m_t$ and the quantized residual $\hat{y}_t$ are encoded into a bitstream by entropy coding, and the bitstream transmitted to one or more decoders. On the decoder side, the quantized residual $\hat{y}_t$ is first de-quantized (e.g., through inverse transformation such as Inverse Discrete Cosine Transform (IDCT)) to obtain a recovered residual $\hat{r}_1$, and then the recovered residual $\hat{r}_t$ is added back to the predicted frame $\tilde{x}_t$ to obtain a reconstructed frame by $\hat{x}_t = \tilde{x}_t + \hat{r}_t$.

Moreover, additional components may be used to improve visual quality of the reconstructed frame $\hat{x}_t$. One or more of the enhancement modules such as Deblocking Filter (DF), Sample-Adaptive Offset (SAO), Adaptive Loop Filter (ALF), Cross-Component Adaptive Filter (CCALF), etc. may be selected to process the reconstructed frame $\hat{x}_t$. For example, the Deblocking Filter (DF) is a video filter that may be applied to a decoded video to improve visual quality and prediction performance by smoothing sharp edges formed between macroblocks when using block coding techniques. The Sample-Adaptive Offset (SAO) is an in-loop filter technique to reduce the mean sample distortion by adding an offset value to each sample. The SAO includes two types of offset techniques, which are edge offset (EO) and band offset (BO). The EO is driven by local directional structures in an image frame to be filtered, and the BO modifies the intensity values of image frames without a dependency on the neighborhood. The Adaptive Loop Filter (ALF) may be used to minimize the mean square error between original sample images and decoded sample images. The order of processing the enhancement modules and a selection of the enhancement modules may be variously modified according to a user setting.

According to an embodiment, an overall method of training a DNN LF is provided. Referring to FIG. 3, a set of N previous reconstructed frames $\{\hat{x}_{it}: \hat{x}_{it} \in N_t\}$ are provided as inputs to a DNN LF module 310. The DNN LF module 310 may generate a high-quality frame $\hat{x}_t^h$ by using an end-to-end (E2E) LF DNN network. The generated high-quality frame $\hat{x}_t^h$ is then computed to assess reconstruction quality of the original image frame $x_t$ by the reconstruction quality computation module 320. The reconstruction quality computation module 320 then outputs the reconstruction quality $L_{quality}(\hat{x}_t^h, x_t)$ to the back-propagation module 330. The back-propagation module 330 feeds back the reconstruction quality $L_{quality}(\hat{x}_t^h, x_t)$ to the DNN LF module 310 to train the DNN LF module 310 according to the reconstruction quality assessed by the reconstruction quality computation module 320.

In addition, an alignment loss $L_{align}(\hat{f}_{i,t}, \tilde{f}_{j,t})$ for the set of N previous reconstructed frames output by the DNN LF module 310 may be fed to the back propagation module 330, which is then fed back to the DNN LF module 310 through the back propagation module 330 to train the DNN LF module 310. A more detailed description of the alignment loss will be described below with reference to FIG. 4.

Furthermore, the high-quality frame $\hat{x}_t^h$ and the original image frame $x_t$ may be input to a discrimination module 340 so as to recognize and detect the difference between the high-quality frame $\hat{x}_t^h$ and the original image frame $x_t$. That is, the discrimination module 340 may compute a discrimination loss $L_{dis}(\hat{x}_t^h, x_t)$ based on $\hat{x}_t^h$ and $x_t$ and transmit the discrimination loss to the back propagation module 330. The discrimination loss $L_{dis}(\hat{x}_t^h, x_t)$ may be fed back to the DNN LF module 310 and the discrimination module 340 through the back propagation module 330 to train the DNN LF module 310 and the discrimination module 340.

The discrimination DNN may be a classification network which uses at least one of $\hat{x}_t^h$ and $x_t$ as an input, to compute a discrimination feature map $d(\hat{x}_t^h)$ or $d(x_t)$. Based on the discrimination feature map $d(\hat{x}_t^h)$ or $d(x_t)$, the discrimination DNN classifies whether the input is the original image frame $x_t$ or the generated (or synthesized) high-quality frame $\hat{x}_t^h$. A classification loss $L_{classify}(\hat{x}_t^h, x_t)$ can be computed to measure a mis-classification loss, such as a categorical cross-entropy loss. Also, a feature discrimination loss $L_{feature}(d(\hat{x}_t^h), d(x_t))$ may be computed to measure the difference between a discrimination feature map computed based on the generated high-quality image frame $\hat{x}_t^h$ and a discrimination feature map computed based on the original image frame $x_t$.

The overall discrimination loss $L_{dis}(\hat{x}_t^h, x_t)$ may be a linear combination of $L_{feature}(d(\hat{x}_t^h), d(x_t))$ and $L_{classify}(\hat{x}_t^h, x_t)$, which is calculated according to the following Equation (1):

$$L_{dis}(\hat{x}_t^h, x_t) = L_{classify}(\hat{x}_t^h, x_t) + \gamma L_{feature}(d(\hat{x}_t^h), d(x_t)) \qquad (1)$$

Here, $\gamma$ is a weight associated with the discrimination feature maps $d(\hat{x}_t^h)$ and $d(x_t)$.

As described above, the reconstruction quality $L_{quality}(\hat{x}_t^h, x_t)$ output by the reconstruction quality computation module 320, the alignment loss $L_{align}(\hat{f}_{i,t}, \tilde{f}_{j,t})$ output by the DNN LF 310, the discrimination loss $L_{dis}(\hat{x}_t^h, x_t)$ output by the discrimination module 340 are transmitted to the back-propagation module 330. Based on receiving these computations from respective modules, the back propagation module 330 may calculate a gradient of a joint loss $L_{joint}$, which may be fed back to the DNN LF module 310 and the discrimination module 340. The gradient of the joint loss $L_{joint}$ may be calculated according to the following Equation (2):

$$L_{joint} = L_{quality}(\hat{x}_t^h, x_t) \lambda_1 L_{align}(\hat{f}_{1,t}, \tilde{f}_{1,t}) + \ldots + \lambda_N L_{align}(\hat{f}_{i,t}, \tilde{f}_{N,t}) + \beta L_{dis}(\hat{x}_t^h, x_t) \qquad (2)$$

Here, $\lambda$ is a weight associated with the alignment loss, and $\beta$ is a weight associated with the discrimination loss.

The gradient of the joint loss $L_{joint}$ can be back-propagated through the back propagation module 330 to update the DNN weight coefficients in the LF DNN (e.g., Feature Extraction DNN, Offset Generation DNN, TDC DNN, Frame Reconstruction DNN, Frame Synthesis DNN, Discrimination DNN, and TDC & Feature Fusion DNN).

Based on feeding back the joint loss $L_{joint}$ to the one or more DNN above, the predicted frame $\tilde{x}_t$ is added to update the set of N previous reconstructed frames $\{\hat{x}_{jt}: \hat{x}_{jt} \in N_t\}$. For example, the oldest frame that is at the greatest distance away from the current frame may be removed from the set of N previous reconstructed frames, and the predicted frame $\tilde{x}_t$ may be added to replace the removed oldest frame. Thereafter, the encoder may enter the next encoding cycle from t to t+1.

According to an embodiment, the DNN LF module 310 may be used in combination with one or more of the above-described additional components (e.g., DF, SAO, ALF, CCALF, etc.) to improve the visual quality of the reconstructed frame $\hat{x}_t$. For example, the reconstructed frame $\hat{x}_t$ may be sequentially processed through the DF, the DNN LF module, the SAO and the ALF. However, the one or more embodiments are not limited thereto, and the order of processing the additional components may be variously configured. In an embodiment, the DNN LF module 310 may be used alone as a replacement for all the other additional components to enhance the visual quality of the reconstructed frame $\hat{x}_t$.

Figure 4:
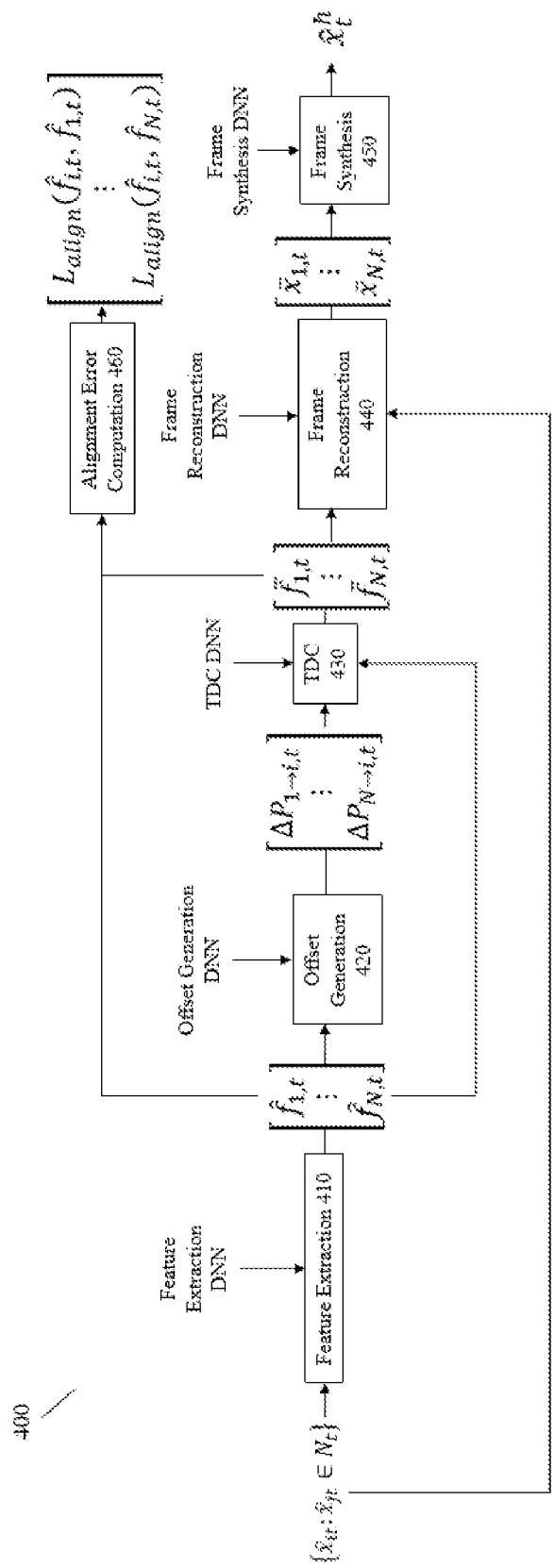
FIG. 4 is a diagram illustrating operations of a DNN LF module using 2D TDC according to an embodiment.

FIG. 4 is a diagram illustrating operations of a DNN LF module using 2D TDC according to an embodiment.

Referring to FIG. 4, a DNN LF module 400 may include a feature extraction module 410, an offset generation module 420, a TDC module 430, a frame reconstruction module 440, a frame synthesis module 450 and an alignment error computation module 460.

The feature extraction module 410 may receive a set of N previous reconstructed frames $\{\hat{x}_{i,t}:\hat{x}_{j,t}\in N_t\}$ as an input, and configured to compute a feature map $\hat{f}_{j,t}, j=1, \ldots, N$ by using a feature extraction DNN through a forward inference. For example, assuming that a frame $\hat{x}_{i,t}$ is used as a reference frame that all other frames must be aligned to, an offset generation module 420 may compute an offset map $\Delta P_{j\rightarrow i,t}$ based on $\hat{x}_{i,t}$ and $\hat{x}_{j,t}$ by concatenating feature maps $\hat{f}_{i,t}$ and $\hat{f}_{j,t}$ and passing the concatenated feature map through an offset generation DNN. Here, the frame $\hat{x}_{i,t}$ may be any frame of the set of N previous reconstructed frames $\{\hat{x}_{i,t}:\hat{x}_{j,t}\in N_t\}$. Without loss of generality, the set of N previous reconstructed frames $\{\hat{x}_{i,t}:\hat{x}_{j,t}\in N_t\}$ are ranked according to their time stamps in an ascending order. Accordingly, a frame to enhance the visual quality may be selected based on the time stamps of the N reconstructed frames $\{\hat{x}_{i,t}:\hat{x}_{j,t}\in N_t\}$. For example, when a target is to enhance the current reconstructed frame $\hat{x}_t$, then, $\hat{x}_{j,t}=\hat{x}_t$. That is, all other previously reconstructed neighboring frames may be prior to the $\hat{x}_t$. In another embodiment, a part of the previously reconstructed neighboring frames may be before $\hat{x}_t$, and the remaining frames may be after $\hat{x}_t$.

The offset map $\Delta P_{j\rightarrow i,t}$ generated by the offset generation module 420 may be input to the TDC module 430. In FIG. 4, the TDC DNN may be formed by stacking several TDC layers, each layer followed by a non-linear activation layer such as the Rectified Linear Unit (ReLU), as well as other DNN layers (e.g., bottleneck layers). The TDC module 430 uses the TDC DNN to compute an aligned feature map $\tilde{f}_{j,t}$ based on the feature map $\hat{f}_{j,t}$ output by the feature extraction module 410 and the offset map $\Delta P_{j\rightarrow i,t}$ output by the offset generation module 420.

According to an embodiment, the TDC DNN may include two-dimensional (2D) TDC layers. For example, assume that $w_k$ denotes a weight coefficient of a 2D TDC kernel, where k is a natural number greater than or equal to 1 (e.g., k=1, ..., K), and $p_k$ denotes a predetermined offset for the k-th location in the kernel (e.g., a 3×3 kernel is defined with K=9 and $p_k \in \{(-1,-1), (-1, 0), \ldots, (1,1)\}$. A 2D TDC layer may compute an output feature $f_{out}$ based on an input feature $f_{in}$ and a learnable offset $\Delta P$, where the feature at a sampling location $p_0$ is determined based on the following equation:

$$f_{out}(p_0)=\Sigma_{k=1}^{K} w_k f_{in}(p_0+p_k+\Delta p_k) \quad (3)$$

Here, the sum of offsets $(p_0+p_k+\Delta p_k)$ may be irregular and may not be an integer, the TDC operation can perform interpolations (e.g., bilinear interpolation) to remedy the irregular position of $(p_0+p_k+\Delta p_k)$.

Moreover, the alignment error computation module 460 may be configured to compute an alignment loss $L_{align}(\hat{f}_{i,t}, \tilde{f}_{j,t})$ to measure an error of misalignment between $\tilde{f}_{j,t}$ and $\hat{f}_{i,t}$. For example, the $L_1$-norm (or a mean of absolute error) or $L_2$-norm (a mean of square root error) may be used to calculate the misalignment. The frame reconstruction module 440 may use a frame reconstruction DNN through feed forward inference computation to generate an aligned frame $\bar{x}_{j,t}$ based on the feature map $\hat{f}_{i,t}$ output by the feature extraction module 410 and the aligned feature map $\tilde{f}_{j,t}$ output by the TDC module 430. The aligned frames $\bar{x}_{1,t}, \ldots \bar{x}_{N,t}$ may be used as inputs to the frame synthesis module 450, and the frame synthesis module 450 may generate the synthesized high-quality frame $\hat{x}_t^h$ using a frame synthesis DNN.

While some specific embodiments of the DNN LF module have been described above, it should be understood that the one or more embodiments of the disclosure are not limited thereto. For example, a types of layer, a number of layer, a kernel size, etc. may be variously configured for each of the feature extraction DNN, the offset generation DNN, the TDC DNN, the frame reconstruction DNN and the frame synthesis DNN. For example, any backbone network, such as ResNET, may be used as the feature synthesis DNN. For example, a set of regular convolution and bottleneck layers may be stacked as the offset generation DNN. For example, a set of TDC layers may be stacked as the TDC DNN, and a few convolution layers with skip connections may be stacked together as the frame reconstruction DNN. For example, a few residual block layers may be stacked together as the frame synthesis DNN.

Figure 5:
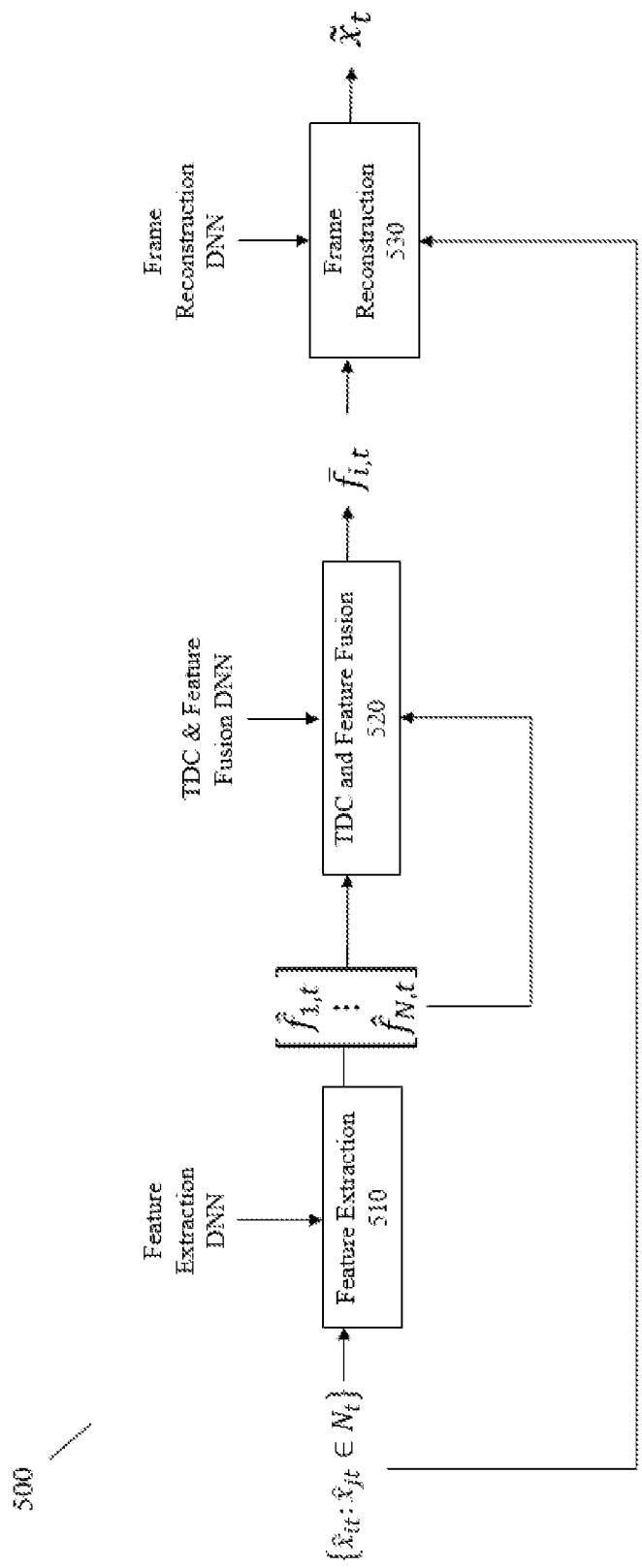
FIG. 5 is a diagram illustrating operations of a DNN LF module using 3D TDC according to an embodiment.

FIG. 5 is a diagram illustrating operations of a DNN LF module using 3D TDC according to an embodiment.

Referring to FIG. 5, the DNN LF module 500 may include a feature extraction module 510, a TDC and feature fusion module 520, and a feature reconstruction module 530. It should be understood that some of the features or functions of the components of the DNN LF module 500 are described above with reference to FIG. 4. Therefore, repeated descriptions thereof may be omitted.

According to an embodiment, input frames $\hat{x}_{1,t}, \ldots, \hat{x}_{N,t}$ may be stacked together to obtain a 4D input tensor of size (n, c, h, w), where c is a number of channels (e.g., three for color frames) and (h, w) provides a resolution of a video frame. The feature extraction module 510 may be configured to compute a 4D feature tensor of feature maps $\hat{f}_{1,t}, \ldots, \hat{f}_{N,t}$ using the feature extraction DNN through forward inference. In an embodiment, the feature extraction DNN uses 3D convolution layers (e.g., C3D) to compute the feature maps $\hat{f}_{1}, \ldots, \hat{f}_{N,t}$ and capture spatiotemporal characteristics of a video. In another embodiment, each individual feature map may be computed using 2D convolution layers as described with reference to FIG. 4. Here, the feature maps $\hat{f}_{1,t}, \ldots, \hat{f}_{N,t}$ may be concatenated into a 4D tensor after computing the feature maps $\hat{f}_{1,t}, \ldots, \hat{f}_{N,t}$ for each individual input frame. Accordingly, the feature extraction module 510 may output a 4D feature tensor.

For example, assuming that $w_k$ denotes a weight coefficient of a 3D TDC kernel and $p_k$ denotes a predetermined offset for the k-th location in the kernel, where k is a natural number greater than or equal to 1 (e.g., k=1, ..., K). The 3D TDC kernel may be defined as K=27 and $p_k \in \{(-1,-1,-1), (-1,-1, 0), \ldots, (1,1,1)\}$. A 3D TDC layer may compute an output feature $f_{out}$ based on an input feature $f_{in}$ and a learnable offset $\Delta P$, where the feature at a sampling location $p_0$ is given using the same Equation (3) provided above.

In FIG. 5, the TDC and feature fusion DNN may be formed by stacking one or more 3D TDC layers, where each layer is followed by a non-linear activation layer such as ReLU. Additionally or alternatively, each 3D TDC layer may be followed by other DNN layers such as bottleneck layers. For example, assume that the frame $\hat{x}_{i,t}$ is a reference frame that all other frames need to be aligned to, and the TDC and feature fusion module 520 uses the TDC and feature fusion DNN to compute a fused aligned feature map $\tilde{f}_{i,t}$ based on the 4D feature tensor $\hat{f}_{1,t}, \ldots, \hat{f}_{N,t}$. The frame reconstruction module 530 uses a frame reconstruction DNN to compute the reconstructed high-quality frame $\hat{x}_t^h$ based on the fused aligned feature map $\tilde{f}_{i,t}$. Here, there is no explicit spatial alignment performed in training the DNN LF module 500. Instead, the 3D deformable convolution directly learns spatiotemporal offsets to generate an aligned fused feature.

While some specific embodiments of the DNN LF module have been described above, it should be understood that the one or more embodiments of the disclosure are not limited thereto. For example, a type of layer, a number of layer, a kernel size, etc. may be variously configured for each of the feature extraction DNN, the TDC and feature fusion DNN, and the frame reconstruction DNN.

Figure 6:
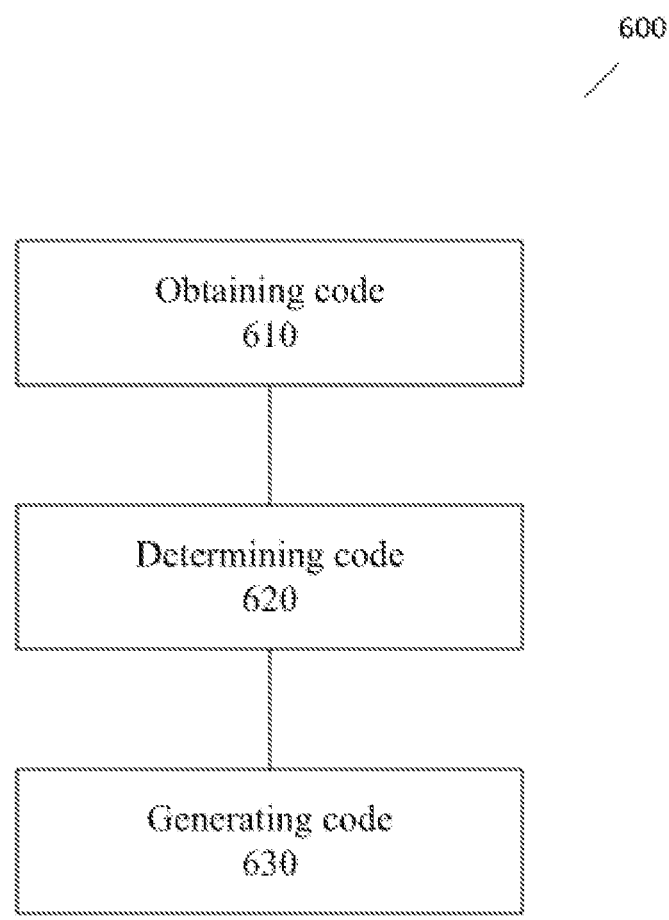
FIG. 6 is a block diagram of an apparatus for processing video data using a DNN with TDC according to an embodiment.

FIG. 6 is a block diagram of an apparatus for processing video data using a DNN LF with TDC according to an embodiment. It should be understood that some of the features or functions of the components of the apparatus 600 are described above with reference to FIGS. 4 and 5. Therefore, repeated descriptions thereof may be omitted.

The apparatus 600 may include at least one memory storing computer program code and at least one processor configured to access the at least one memory and operate as instructed by the computer program code. The computer program code 600 may include obtaining code 610, determining code 620 and generating code 630.

The obtaining code 610 may be configured to obtain a set of reconstructed image frames in a video sequence. According to an embodiment, the obtaining code 610 may be configured to perform operations of the feature extraction module 410 and 510 described above with respect to FIGS. 4 and 5.

The determining code 620 may be configured to determine a feature map for each of the plurality of image frames, determine an offset map based on the feature map and determine an aligned feature map by performing a temporal deformable convolution (TDC) on the feature map and the offset map. According to an embodiment, the determining code 620 may be configured to perform operations of the offset generation module 420, the TDC 430 and alignment error computation module 460 described above with respect to FIG. 4 and the TDC and feature fusion module 520 described above with respect to FIG. 5.

The generating code 630 may be configured to generate a plurality of aligned frames and synthesize the plurality of aligned frames to output a plurality of high-quality frames corresponding to the plurality of image frames. According to an embodiment, the generating code 630 may be configured to perform operations of the frame reconstruction module 430 and the frame synthesis module 450 of FIG. 4 and the frame reconstruction module 530 of FIG. 5.

Although the apparatus 600 described as including only the obtaining code 610, the determining code 620 and the generating code 630, the one or more embodiments of the disclosure are not limited thereto. The one or more embodiments may include more or fewer components or parts than those shown in FIG. 6.

The term used in the one or more embodiments of the disclosure such as "unit" or "module" indicates a unit for processing at least one function or operation, and may be implemented in hardware, software, or in a combination of hardware and software.

The term "unit", "code" or "module" may be implemented by a program that is stored in an addressable storage medium and executable by a processor.

For example, the term "unit", "code" or "module" may include software components, object-oriented software components, class components and task components, processes, functions, attributes, procedures, subroutines, segments of a program code, drivers, firmware, microcode, circuitry, data, databases, data structures, tables, arrays, and/or variables.

Some of the embodiments of the disclosure have been shown and described above. However, the one or more embodiments of the disclosure are not limited to the aforementioned specific embodiments. It may be understood that various modifications, substitutions, improvements and equivalents thereof can be made without departing from the spirt and scope of the disclosure. It should be understood that such modifications, substitutions, improvements and equivalents thereof shall fall within the protection scope of the disclosure, and should not be construed independent from the inventive concept or prospect of the disclosure.

What is claimed is:

1. A method of performing video coding using one or more neural networks with a loop filter, the method comprising:
   obtaining a plurality of image frames in a video sequence;
   determining a feature map for each of the plurality of image frames;
   selecting a reference frame among the plurality of image frames, the reference frame being a frame to which other frames in the plurality of image frames are to be aligned;
   concatenating a reference feature map of the reference frame and a feature map of each of the other frames in the plurality of image frames and passing a concatenated feature map through an offset generation Deep Neural Network (DNN), to generate an offset map;
   determining an aligned feature map by performing a temporal deformable convolution (TDC) on the feature map and the offset map; and
   generating a plurality of aligned frames based on the aligned feature map.

2. The method of claim 1, further comprising:
   synthesizing the plurality of aligned frames to output a plurality of high-quality frames corresponding to the plurality of image frames.

3. The method of claim 1, further comprising:
   determining an alignment loss indicating an error of misalignment between the feature map and the aligned feature map,
   wherein the one or more neural networks are trained by the alignment loss.

4. The method of claim 1, wherein the obtaining the plurality of image frames comprises stacking the plurality of image frames to obtain a 4-dimensional (4D) input tensor.

5. The method of claim 1, wherein the plurality of image frames are further processed using at least one of a Deblocking Filter (DF), a Sample-Adaptive Offset (SAO), an Adaptive Loop Filter (ALF) or a Cross-Component Adaptive Filter (CCALF).

6. The method of claim 2, wherein the plurality of high-quality image frames are assessed to determine reconstruction quality of the plurality of image frames,
   wherein the reconstruction quality of the plurality of image frames are back-propagated in the one or more neural networks, and
   wherein the one or more neural networks are trained by the reconstruction quality of the plurality of image frames.

7. The method of claim 1, further comprising determining a discrimination loss indicating an error in a classification of whether each of the plurality of image frames is an original image frame or a high-quality frame, and
   wherein one or more neural networks implemented in the apparatus are trained by the discrimination loss.

8. The method of claim 1, wherein the determining the aligned feature map comprises using a temporal deformable convolution deep neural network (TDC DNN),
   wherein the TDC DNN comprises a plurality of TDC layers in a stack, and wherein each of the plurality of TDC layers is followed by a non-linear activation layer including a Rectified Linear Unit (ReLU).

9. An apparatus comprising:
at least one memory storing computer program code; and
at least one processor configured to access the at least one memory and operate as instructed by the computer program code, the computer program code comprising:
obtaining code configured to cause the at least one processor to obtain a plurality of image frames in a video sequence;
determining code configured to cause the at least one processor to:
    determine a feature map for each of the plurality of image frames;
    select a reference frame among the plurality of image frames, the reference frame being a frame to which other frames in the plurality of image frames are to be aligned;
    concatenate a reference feature map of the reference frame and a feature map of each of the other frames in the plurality of image frames and passing a concatenated feature map through an offset generation Deep Neural Network (DNN), to generate an offset map; and
    determine an aligned feature map by performing a temporal deformable convolution (TDC) on the feature map and the offset map; and
generating code configured to cause the at least one processor to generate a plurality of aligned frames based on the aligned feature map.

10. The apparatus of claim 9, wherein the generating code is further configured to cause the at least one processor to synthesize the plurality of aligned frames to output a plurality of high-quality frames corresponding to the plurality of image frames.

11. The apparatus of claim 9, wherein the determining code is further configured to cause the at least one processor to determine an alignment loss indicating an error of misalignment between the feature map and the aligned feature map, and
wherein one or more neural networks implemented in the apparatus are trained by the alignment loss.

12. The apparatus of claim 9, wherein the obtaining code is further configured to cause the at least one processor to arrange the plurality of image frames in a stack to obtain a 4-dimensional (4D) input tensor.

13. The apparatus of claim 9, further comprising:
processing code configured to cause the at least one processor to process the plurality of image frames using at least one of a Deblocking Filter (DF), a Sample-Adaptive Offset (SAO), an Adaptive Loop Filter (ALF) or a Cross-Component Adaptive Filter (CCALF).

14. The apparatus of claim 10, wherein the plurality of high-quality image frames are assessed to determine reconstruction quality of the plurality of image frames,
wherein the reconstruction quality of the plurality of image frames are back-propagated to one or more neural networks, and
wherein the one or more neural networks are trained by the reconstruction quality of the plurality of image frames.

15. The apparatus of claim 9, wherein the determining code is further configured to cause the at least one processor to determine a discrimination loss indicating an error in a classification of whether each of the plurality of image frames is an original image frame or a high-quality frame, and
wherein one or more neural networks implemented in the apparatus are trained by the discrimination loss.

16. The apparatus of claim 9, wherein the determining code is further configured to cause the at least one processor to determine the aligned feature map using a temporal deformable convolution deep neural network (TDC DNN),
wherein the TDC DNN comprises a plurality of TDC layers in a stack, and
wherein each of the plurality of TDC layers is followed by a non-linear activation layer including a Rectified Linear Unit (ReLU).

17. A non-transitory computer-readable storage medium storing computer program code, the computer program code, when executed by at least one processor, the at least one processor is configured to:
obtain a plurality of image frames in a video sequence;
determine a feature map for each of the plurality of image frames;
selecting a reference frame among the plurality of image frames, the reference frame being a frame to which other frames in the plurality of image frames are to be aligned;
concatenating a reference feature map of the reference frame and a feature map of each of the other frames in the plurality of image frames and passing a concatenated feature map through an offset generation Deep Neural Network (DNN), to generate an offset map;
determine an aligned feature map by performing a temporal deformable convolution (TDC) on the feature map and the offset map; and
generate a plurality of aligned frames based on the aligned feature map.

18. The non-transitory computer-readable storage medium of claim 17, wherein the at least one processor is further configured to:
synthesize the plurality of aligned frames to output a plurality of high-quality frames corresponding to the plurality of image frames.

* * * * *